(12) United States Patent
Boyer (10) Patent No.: US 7,528,397 B2
(45) Date of Patent: May 5, 2009

(54) THERMAL INFRARED SIGNAGE METHOD WITH APPLICATION TO INFRARED WEAPON SIGHT CALIBRATION

(76) Inventor: Thomas R. Boyer, 2105 Arrowhead Farms Ct., Gambrills, MD (US) 21054

( * ) Notice: Subject to any disclaimer, the term of this patent is extended or adjusted under 35 U.S.C. 154(b) by 365 days.

(21) Appl. No.: 11/610,602

(22) Filed: Dec. 14, 2006

(65) Prior Publication Data
US 2009/0008541 A1  Jan. 8, 2009

Related U.S. Application Data

(60) Provisional application No. 60/787,667, filed on Mar. 31, 2006.

(51) Int. Cl.
G01D 18/00 (2006.01)
G21K 1/00 (2006.01)

(52) U.S. Cl. ............. 250/505.1; 250/495.1; 250/504 R; 250/482.1; 250/339.06; 430/252; 156/71; 156/123; 428/131; 428/214

(58) Field of Classification Search ............. 250/505.1, 250/517.1, 526, 507.1, 515.1, 493.1, 494.1, 250/495.1, 497.1, 503.1, 504 R, 472.1–488.1, 250/336.1, 338.1, 339.06, 339.14, 341.1, 250/341.6, 342, 363.01; 430/252–254, 200–203, 430/204, 964; 156/63, 71, 123; 428/131, 428/214, 215
See application file for complete search history.

(56) References Cited

U.S. PATENT DOCUMENTS

| | | | | |
|---|---|---|---|---|
| 3,453,957 | A * | 7/1969 | Hamilton | 101/269 |
| 3,987,229 | A * | 10/1976 | Rairdon et al. | 428/148 |
| 4,390,387 | A * | 6/1983 | Mahn | 428/90 |
| 4,853,671 | A * | 8/1989 | Iversen et al. | 338/308 |
| 5,279,889 | A * | 1/1994 | MacCollum | 428/212 |
| 5,374,477 | A * | 12/1994 | Lawless et al. | 428/317.3 |
| 5,389,180 | A * | 2/1995 | MacCollum | 156/257 |
| 5,393,639 | A * | 2/1995 | Kourepenis | 430/254 |
| 5,593,771 | A * | 1/1997 | Lawless et al. | 428/317.3 |
| 6,534,152 | B2 * | 3/2003 | Freeman | 428/172 |
| 6,586,080 | B1 * | 7/2003 | Heifetz | 428/198 |
| 7,223,312 | B2 * | 5/2007 | Vargo et al. | 156/71 |
| 2004/0028870 | A1 * | 2/2004 | Lehr | 428/67 |
| 2004/0151875 | A1 * | 8/2004 | Lehr et al. | 428/131 |
| 2004/0246092 | A1 * | 12/2004 | Graves et al. | 338/22 R |
| 2005/0252602 | A1 * | 11/2005 | Tateishi | 156/230 |
| 2006/0211317 | A1 * | 9/2006 | Rossi et al. | 442/149 |
| 2006/0253972 | A1 * | 11/2006 | Schmidt et al. | 4/541.6 |
| 2009/0008541 | A1 * | 1/2009 | Boyer | 250/252.1 |

* cited by examiner

Primary Examiner—Bernard E Souw
(74) Attorney, Agent, or Firm—Latimer, Mayberry & Matthews IP Law, LLP (57) ABSTRACT

A method of creating signage visible by infrared cameras and infrared weapon sights is provided. Particular application is made to the calibration of infrared weapon sights. An improved calibration target and method is developed.

24 Claims, 6 Drawing Sheets

THERMAL INFRARED SIGNAGE METHOD WITH APPLICATION TO INFRARED WEAPON SIGHT CALIBRATION

CROSS-REFERENCE TO RELATED APPLICATIONS

This application relies on and claims the benefit of the filing date of U.S. Provisional Patent Application No. 60/787,667, filed 31 Mar. 2006, the entire disclosure of which is hereby incorporated herein by reference.

BACKGROUND OF THE INVENTION

1. Field of the Invention

This invention relates to the field of firearms. More specifically, the invention relates to articles of manufacture for use as identifiers of objects using infrared light. In exemplary embodiments, the invention finds use in targeting and sight calibration for firearms equipped with infrared sighting scopes. The present invention thus generally relates to signage visible to those using infrared imaging techniques, and particularly to a method of calibrating infrared weapons sights.

2. Description of Related Art

Users of infrared cameras for operations such as the military and police have the advantage of being able to view heat sources, such as people, in complete darkness. However, they are unable while using infrared imaging techniques to differentiate words or symbols. In order to convey information they can utilize heated objects, such as exothermic chemical heaters. However, these and similar technologies only create a point in the imaging system. Therefore, the ability to convey complex information is very limited. The invention addresses this and demonstrates a method of making more complex signage that is visible to people using infrared imaging.

Figure 1:
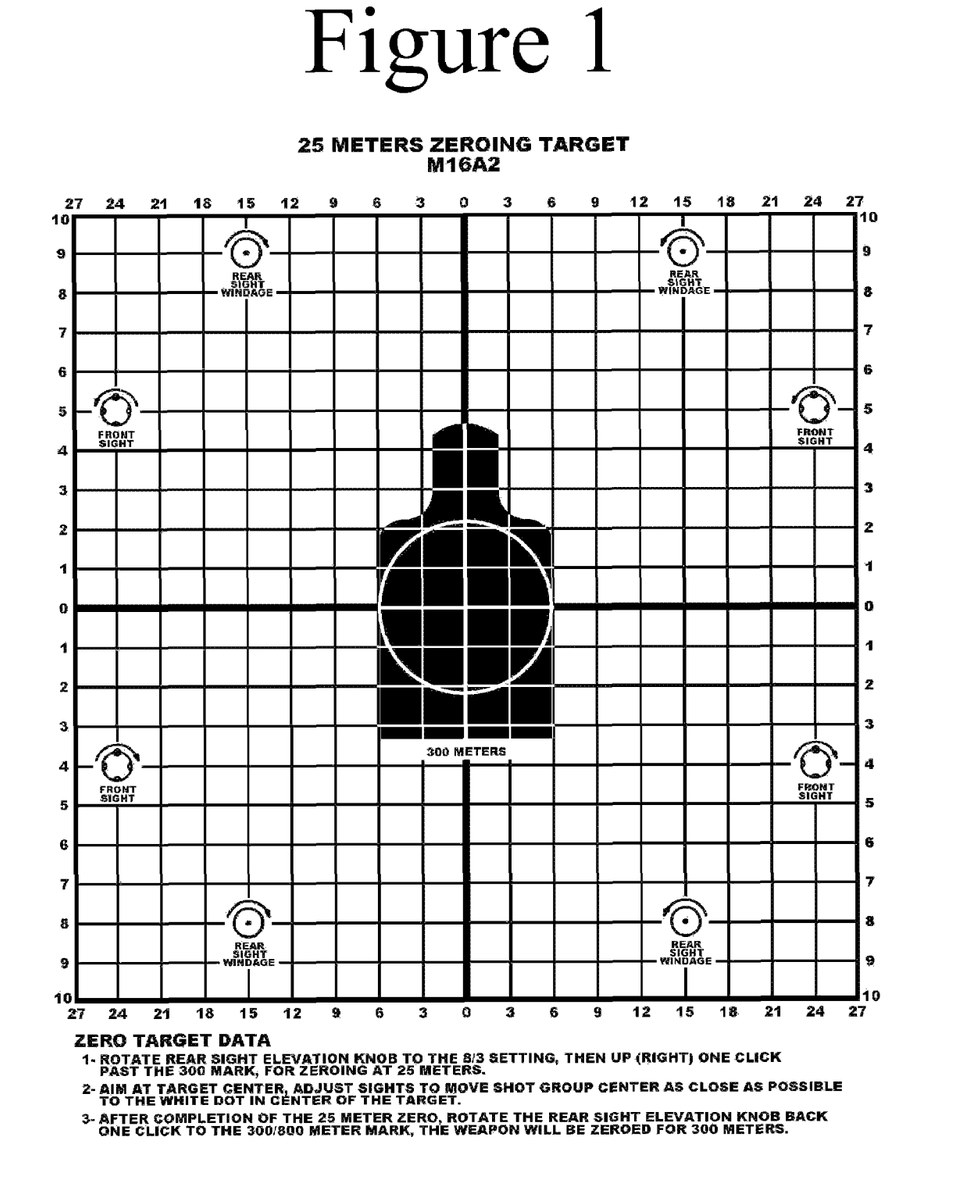
FIG. 1 depicts a typical 25 meter calibration target for use with visible sights.

In particular, users of weapons with infrared sights such as the TWS (Thermal Weapon Sight) from BAE, DRS Technologies, or Raytheon must calibrate their sight to their weapon to ensure they will hit their target. This is very important whenever the sight is disturbed in any way. Using traditional iron sights, the user fires at the center of a target similar to the target shown in FIG. 1. The group of shots should land a predefined distance away from the target center depending on the weapon and sight characteristics. If the shots do not hit the target where expected, the sights must be adjusted so they will hit the target where they should. However, the soldier using a thermal weapon sight is unable to see the target to perform this calibration. Migliorini (U.S. Pat. No. 6,337,475) proposes using a small electrically heated silhouette placed on the front of a standard 25 meter zeroing target. This appears to be a valid solution, but lacks in the following:

- a battery is required for operation, which poses logistical problems due to the greater weight of the 25 meter zeroing target. Additionally, battery disposal can create logistical problems;
- the addition of a battery and wiring poses significant cost increases in the 25 meter zeroing target relative to those used with iron sights; and
- the heat from the silhouette can bleed off from it and begin to warm the target, thereby increasing the size of the target for the user. This could result in lower accuracy.

Others have also proposed articles of manufacture, methods, and means for sighting of infrared optical devices. Among these are U.S. Pat. No. 6,767,015, which discloses a thermal target; U.S. Pat. No. 6,051,840, which discloses an infrared heat emitting device; U.S. Pat. No. 6,020,040, which discloses a thermal pack having a plurality of individual heat cells; and U.S. Pat. No. 5,918,590, which discloses heat cells.

Although each of these solutions has advantages, each also has drawbacks and limitations. Therefore a new method of creating signage is required that will address needs in the art.

SUMMARY OF THE INVENTION

The invention in general comprises a physical object that can be used as a sign for, among other things, calibrating an infrared targeting scope. It also provides a method of making such an object, and a method of calibrating an infrared imaging device, such as a thermal camera, using such an object. The invention thus provides an article of manufacture, which is an infrared sign or target for calibrating devices that detect infrared radiation, as well as methods of making and using the article of manufacture.

In embodiments, the object is a sign that comprises a laminar member with a first and second surface. The first surface can comprise any one or more of a multitude of materials. It typically has the characteristic of interfacing properly with any materials adhered to it. The second surface has the characteristic of having low emissivity (emissivity value of about 0.4 or less). A design consisting of words, graphics, or any other creation can be printed on the second surface. The printing has the characteristic of being the proper thickness and type such that the printed locations on the second surface are of high emissivity (emissivity value of about 0.7 or more). When viewed through an infrared imaging device, the design will be readily apparent. Using this invention, any conceivable design can be created using traditional printing means, such as a silk screening. It should be understood that any technology used to print and any design falls within the scope of this patent. Additionally removing sections of the film will typically create regions of higher emissivity where the background is able to show through the film.

In embodiments, the method of making the object, such as a marker or sign, comprises making an object that is visible using an infrared optical device, such as an infrared camera or infrared optical sighting device for a weapon. The method of making the marker or sign provides an object that contains characters and/or images that can be detected with an infrared detector, but may or may not be detectable by the naked eye. In general, the method comprises providing an object with a surface and depositing on the surface one or more substances that can be detected with a device sensitive to infrared electromagnetic radiation.

In embodiments, the method of calibrating an infrared imaging device, such as an infrared detector, comprises viewing an object according to the invention through such a device, and determining whether the device is calibrated to correctly locate an image or character on the object. Where the determining step identifies a mis-calibration, the method typically further comprises adjusting the location, angle, or other parameter of the imaging device to more accurately calibrate the device. Often, the method will be practiced under controlled conditions, such as at a shooting range on a military facility or police facility.

For additional clarity in the infrared imaging device, the laminar member can be completely or partially warmed. In the area where warmth is applied the difference in infrared energy emitted from the non-printed second surface relative to the printed second surface will increase. As this difference increases the clarity in the infrared imaging device will increase. In a preferred embodiment, the heat is applied to the first surface of the laminar member. In one embodiment, the heat is applied utilizing a chemical heater, which begins to warm when exposed to oxygen in the air (e.g., "Tosti Toes" from Heatmax). The chemical heater can be completely biodegradable, which minimizes the cost and logistics of disposal. In another embodiment, the heat is applied utilizing an electric heater, which begins to warm when an electric voltage is applied to it. It should be understood that any technology used to heat falls within the scope of this patent. The heater shape does not have to assume a specific shape for the invention because the infrared image is created on the front surface and is a function of the printing not the geometry of the heater.

For yet other additional or alternative clarity, the low emissivity sections of the signage can be insulated from the heater. This further improves the contrast between the regions of the target in the thermal viewer.

For improved use, in embodiments, the assembly can be built on a cardboard platform, such as a corrugated cardboard platform, that maintains the proper shape and/or position of the target relative to where it is mounted.

Figure 6:
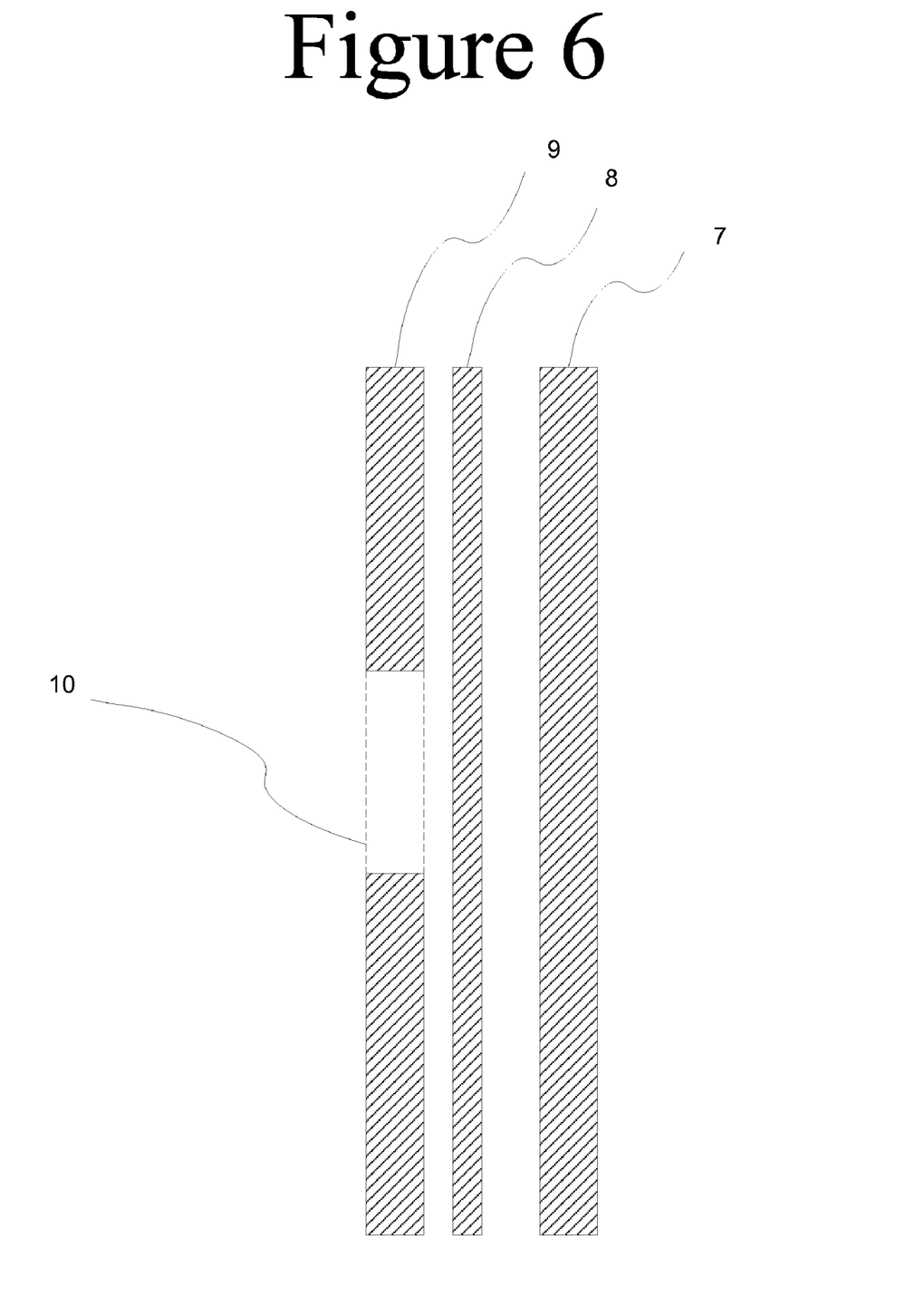
FIG. 6 is an illustration of further embodiments of the invention

In another preferred embodiment the infrared pattern can be created by altering the insulation value of the article rather than the emissivity value. Another preferred embodiment of the invention comprises a laminar member (9), such as C flute cardboard without low emissivity film, as shown in FIG. 6. This is a less expensive, though possibly less effective, article of manufacture. All surfaces of the laminar member (9) have the characteristic of having high emissivity. Removing sections of laminar member (9) modifies its insulation value in those areas. The removed section or sections create a pattern of higher and lower thermal insulation that can be used to generate a pattern of higher and lower infrared emissions.

To generate the infrared pattern in the thermal weapons sight, the laminar member can be completely or partially warmed using laminar members. In the area where the laminar member is cut away, insulation is negligible and infrared energy is emitted from the emitting surface of the heat generator; in areas without cutouts, the cardboard acts as an insulator and there is less infrared emitted from that surface. The heater can comprise a heat generator and a heated surface, such as solid bleached sulfate (SBS) board, which may provide thermal dissipation and/or mechanical stability. In a preferred embodiment, the heat is applied utilizing a chemical heater that begins to warm when exposed to oxygen in the air. The entire target or just the heater is packaged in an airtight package to prevent the heater from operating before its intended use. In embodiments, the chemical heater is completely biodegradable, which minimizes the cost and logistics of disposal. In another embodiment, the heat is applied utilizing an electric heater, which begins to warm when an electric voltage is applied to it. In an embodiment, there is an electrical power source, such as a battery with a part such as a pull-tab, which prevents current from flowing until the tab is pulled. When the tab is removed, the circuit is connected and current flows heating the heater. It should be understood that any method of preventing current flow until the target is ready for use is contemplated by the present invention. It should also be understood that any technology used to heat is contemplated by the invention. It also should be noted that Migliorini (U.S. Pat. No. 6,337,475) proposes placing an electric heater on the second surface of a paper target, which has high or normal emissivity. The effectiveness of this is dependent on the effectiveness of the thermal insulating layer. If not completely effective, the silhouette shape will become distorted. On the other hand, the heater shape does not have to assume a specific shape for the present invention because the infrared image is created on the front surface and is a function of the insulator geometry, not the geometry of the heater. The pattern created by the insulator cutouts creates a 25 Meter Zeroing Target or any other object or pattern of interest to the practitioner. When viewed through an infrared imaging device, the target will be readily apparent. Using the article of manufacture of the present invention, any conceivable sign, target, etc. can be created by altering the shape of the insulator.

DETAILED DESCRIPTION OF PREFERRED EMBODIMENTS OF THE INVENTION

The present invention will now be described with detailed reference to exemplary embodiments of the invention. The following detailed description should not be considered as a limitation on the invention, but rather should be considered as a detailed description of certain embodiments, which is presented to give those of skill in the art a better understanding of various features of the invention.

Figure 2:
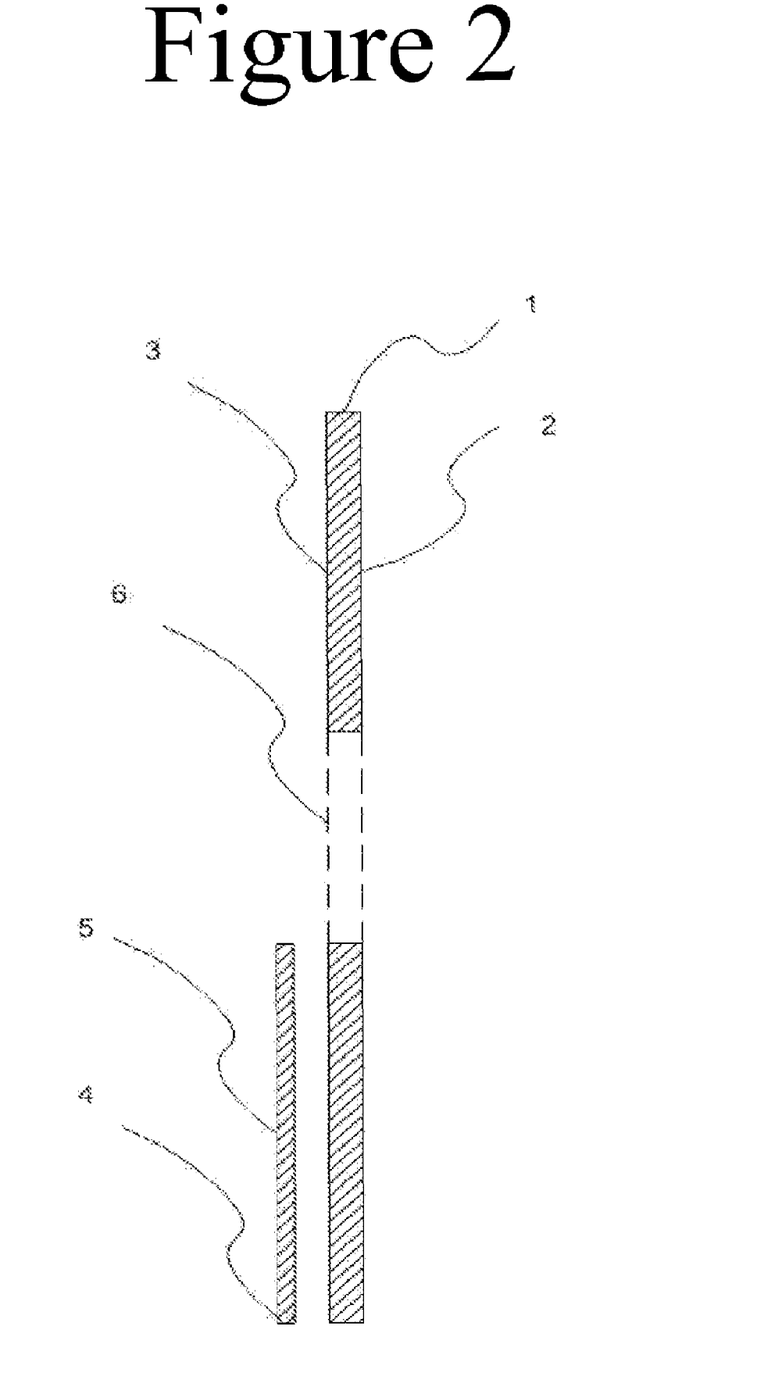
FIG. 2 is an illustration of certain embodiments of the invention.

One preferred embodiment of the invention comprises a laminar member (1) with a first (3) and second (2) surface, as shown in FIG. 2. Painted Mylar film, commonly referred to as "no power material" or "reverse polarity material", can be used for this purpose. The first surface (3) can comprise a multitude of materials. It has the characteristic of interfacing properly with any materials adhered to it. The second surface (2) has the characteristic of having low emissivity. On the second surface (2) is printed a 25 Meter Zeroing Target or any other object or pattern of interest (4) to the practitioner. An exemplary sample target appears in FIG. 1. The printing (4) has the characteristic of being the proper thickness and type such that the printed locations on the second surface are of high emissivity. When viewed through an infrared imaging device, the target will be readily apparent. Using the article of manufacture of the present invention, any conceivable sign, target, etc. can be created using traditional printing means, such as a silk screening. It should be understood that any technology used to print and any target design is contemplated by the present invention.

Figure 3:
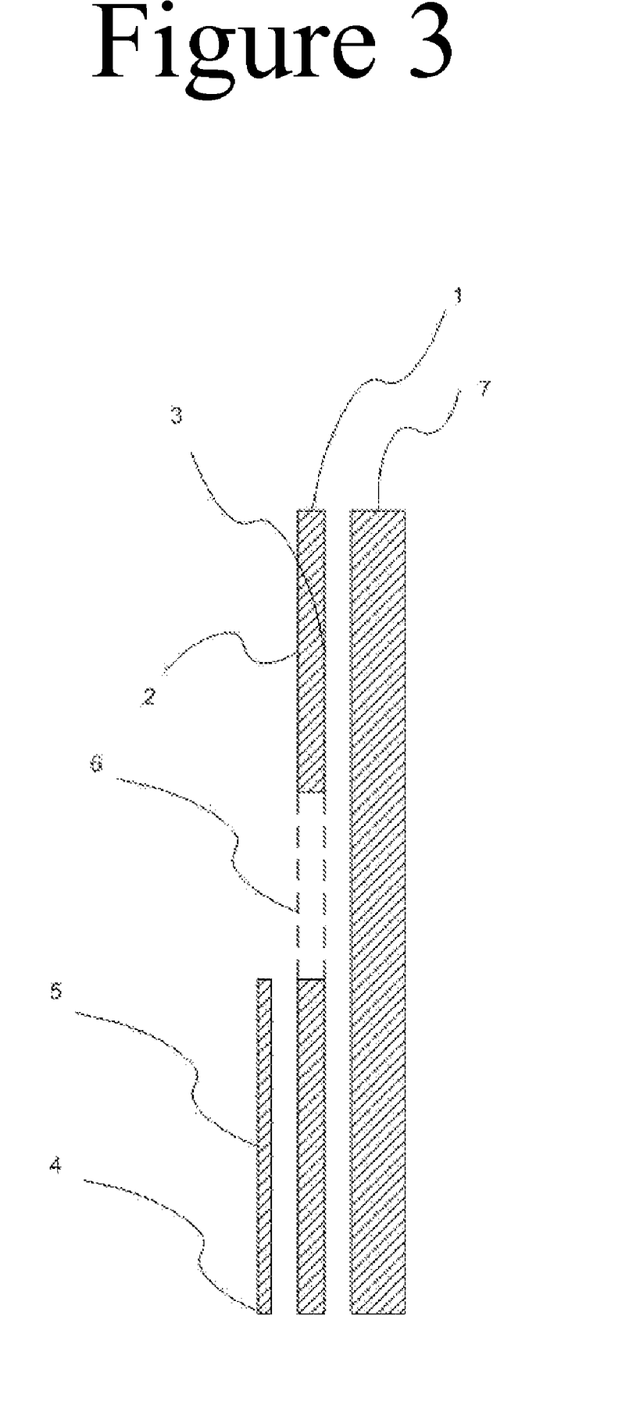
FIG. 3 is an illustration of other embodiments of the invention.
Figure 4:
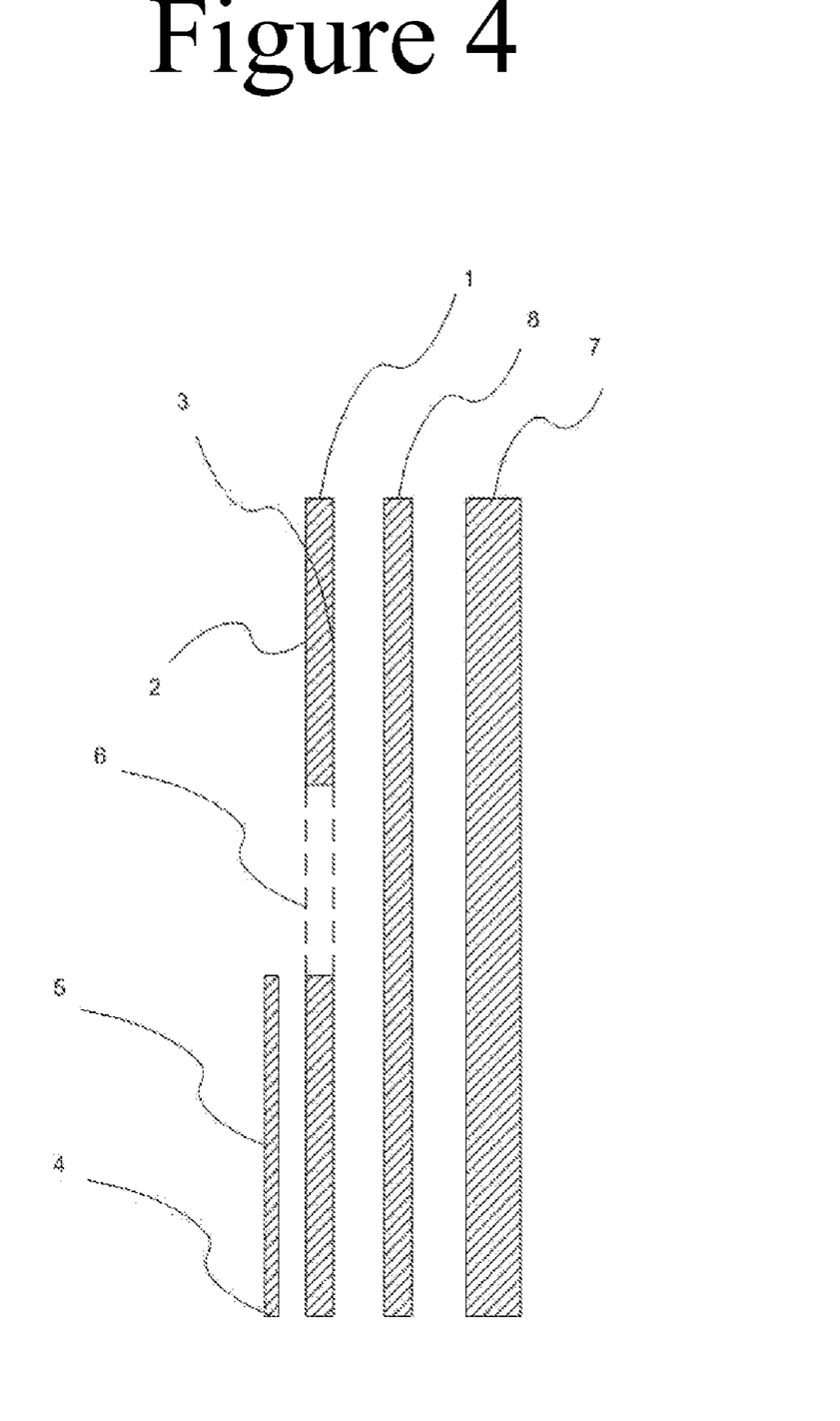
FIG. 4 is an illustration of yet other embodiments of the invention.
Figure 5:
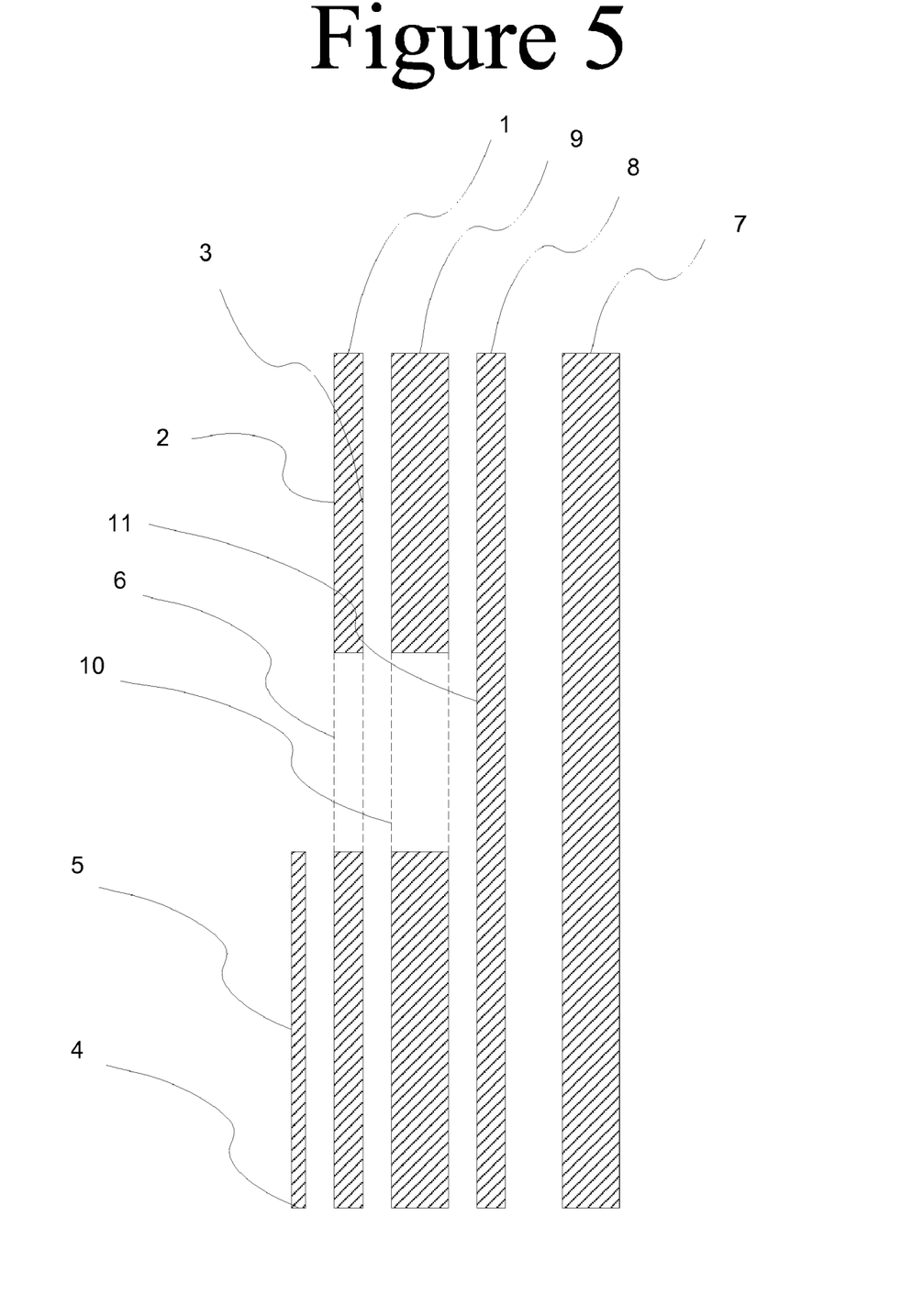
FIG. 5 is an illustration of further embodiments of the invention.

For additional clarity in the thermal weapons sight, the laminar member can be completely or partially warmed, as depicted in FIG. 3 and FIG. 4. In the area where warmth is applied, the difference in infrared energy emitted from the non-printed second surface (3) relative to the printed second surface (4) will increase. As this difference increases, the clarity in the thermal weapons sight will increase. The practitioner may need to adjust the detector gain and contrast for optimum clarity. In a preferred embodiment, the heat is applied to the first surface (3) of the laminar member. The heater comprises a heat generator (7) and a heated surface (8), which may provide thermal dissipation and/or mechanical stability. Elements (7) and (8) may comprise a single object or multiple objects. In a preferred embodiment, the heat is applied utilizing a chemical heater (3), such as a "Toasti Toes" from Heatmax which begins to warm when exposed to oxygen in the air. The entire target or just the heater is packaged in an air-tight package to prevent the heater from operating before use. In embodiments, the chemical heater is completely biodegradable, which minimizes the cost and logistics of disposal. In another embodiment, the heat is applied utilizing an electric heater (6), which begins to warm when an electric voltage is applied to it. In an embodiment, there is an electrical power source such as a battery with a part such as a pull tab, which prevents current from flowing until the tab is pulled. When the tab is removed, the circuit is connected and current flows heating the heater. It should be understood that any method of preventing current flow until the target is ready for use is contemplated by the present invention. It should also be understood that any technology used to heat is contemplated by the invention. It also should be noted that Migliorini (U.S. Pat. No. 6,337,475) proposes placing an electric heater on the second surface of a paper target, which has high or normal emissivity. The effectiveness of this is dependent on the effectiveness of the thermal insulating layer. If not completely effective, the silhouette shape will become distorted. On the other hand, the heater shape does not have to assume a specific shape for the present invention because the infrared image is created on the front surface and is a function of the printing, not the geometry of the heater.

In some embodiments, for improved clarity, an insulating laminar member (9) is placed between the heater and the first laminar layer. This further minimizes the temperature of the low-emissive surface (3). Additionally or alternatively, cutouts are placed in the first layer (6) and the insulating laminar layer (10), which selectively exposes portions of the emitting surface of the heater. This further increases the difference between the amount of energy emitted from the high and low emissivity areas of the target. This can improve the image in the thermal imaging device.

Another preferred embodiment of the invention comprises a laminar member (9) such as C flute cardboard without low emissivity film, as shown in FIG. 6. This is a less expensive though potentially less effective article of manufacture. All surfaces of the laminar member (9) have the characteristic of having high emissivity. Removing sections of laminar member (9) modifies its insulation value in those areas. The removed section or sections create a pattern of higher and lower thermal insulation that can be used to generate a pattern of higher and lower infrared emissions.

To generate the infrared pattern in the thermal weapons sight, the laminar member can be completely or partially warmed using laminar members (7,8), as depicted in FIG. 6. In the area where the laminar member is cut away, insulation is negligible and infrared energy is emitted from the surface (11); in areas without cutouts, the cardboard acts as an insulator and there is less infrared emitted from that surface (12). The heater comprises a heat generator (7) and a heated surface (8) such as solid bleached sulfate (SBS) board, which may provide thermal dissipation and/or mechanical stability. Elements (7) and (8) may comprise a single object or multiple objects. In a preferred embodiment, the heat is applied utilizing a chemical heater (7), such as a "Toasti Toes" from Heatmax that begins to warm when exposed to oxygen in the air. The entire target or just the heater is packaged in an airtight package to prevent the heater from operating before its intended use. In embodiments, the chemical heater is completely biodegradable, which minimizes the cost and logistics of disposal. In another embodiment, the heat is applied utilizing an electric heater (7), which begins to warm when an electric voltage is applied to it. In an embodiment, there is an electrical power source such as a battery with a part such as a pull tab, which prevents current from flowing until the tab is pulled. When the tab is removed, the circuit is connected and current flows heating the heater. It should be understood that any method of preventing current flow until the target is ready for use is contemplated by the present invention. It should also be understood that any technology used to heat is contemplated by the invention. It also should be noted that Migliorini (U.S. Pat. No. 6,337,475) proposes placing an electric heater on the second surface of a paper target, which has high or normal emissivity. The effectiveness of this is dependent on the effectiveness of the thermal insulating layer. If not completely effective, the silhouette shape will become distorted. On the other hand, the heater shape does not have to assume a specific shape for the present invention because the infrared image is created on the front surface and is a function of the insulator geometry, not the geometry of the heater. The pattern created by the insulator cutouts creates a 25 Meter Zeroing Target or any other object or pattern of interest to the practitioner. When viewed through an infrared imaging device, the target will be readily apparent. Using the article of manufacture of the present invention, any conceivable sign, target, etc. can be created by altering the shape of the insulator.

In embodiments, the entire assembly is built on a foldable frame that provides rigidity and holds the target at a predetermined angle relative to the target-mounting surface.

In the practice of one embodiment of the invention relating to a 25 m target, the weapons user will remove the target and/or heater from its air-tight package. If not already affixed to the rear of the target, the heater is affixed there and the assembly is placed on a fixture. The weapons user, or shooter, returns to the shoot position twenty-five meters from the target. The chemical heater will begin to react, warming the target. When viewed through the thermal weapon sight, the aim point will be visible. The shooter will shoot at the aim point in the center of the target. After shooting, the shooter will note the location of the rounds relative to the point of aim and, if needed, adjust his sights to bring the rounds to their correct location.

The invention claimed is:

1. An article of manufacture comprising a laminar member, said laminar member comprising a first surface and a second surface,
   the first surface comprising one or more materials that can adhere to at least one other material;
   the second surface having an emissivity value less than 0.4 and having a printed design comprising words, graphics, or any other creation printed thereon, wherein the printed design is the proper thickness and type to provide the second surface with an emissivity having a value greater than 0.7 in the area of the printed design.

2. The article of manufacture of claim 1, further comprising:
   one or more cutouts in the laminar member that allow the infrared emissions of objects behind the laminar member to pass through and be viewed.

3. The article of manufacture of claim 1, further comprising, as part of the first surface, at least one heater.

4. The article of manufacture of claim 3, wherein the heater comprises a heat generating object and an additional or integrated laminar member whose first surface acts as an emitting surface.

5. The article of manufacture of claim 3, further comprising a laminar insulating member between the first member and the heater.

6. The article of manufacture of claim 5, wherein the first member, insulating member, or both comprise one or more cutouts that expose the emitting surface of the heater to the environment.

7. The article of manufacture of claim 3, wherein the heater is a chemical heater.

8. The article of manufacture of claim 3, wherein the heater is an electric heater.

9. The article of manufacture of claim 8, wherein the heater comprises a voltage source.

10. The article of manufacture of claim 9, wherein the voltage source comprises a pull tab or other device that allows the current to flow when activated.

11. An airtight package comprising the article of manufacture of claim 1, wherein the airtight package prevents heating of the article of manufacture before use.

12. The article of manufacture of claim 1, further comprising:
 a frame that folds out and holds the article at a predetermined angle relative to any mounting surface to which the article may be fixed.

13. An article of manufacture comprising a laminar member, wherein the laminar member comprises a first surface and a second surface:
 the first surface comprising one or more materials that can adhere one or more materials,
 the second surface having an emissivity value less than 0.4 and comprising one or more areas having an emissivity value greater than 0.7, and
 wherein optionally the laminar member comprises regions of different thermal insulating properties that together create an image of a calibration target viewable by an infrared weapon sight.

14. The article of manufacture of claim 13, further comprising one or more cutouts that allow the infrared emissions of objects behind the laminar member to be viewed.

15. The article of manufacture of claim 13, wherein the first surface comprises a heater.

16. The article of manufacture of claim 15, wherein the heater comprises a heat generating object and an additional or integrated laminar member whose first surface acts as an emitting surface.

17. The article of manufacture of claim 15, comprising a laminar insulating member between the first member and the heater.

18. The article of manufacture of claim 17, wherein the first member and insulating member comprise one or more cutouts exposing the emitting surface of the heater.

19. The article of manufacture of claim 15, wherein the heater is a chemical heater.

20. The article of manufacture of claim 15, wherein the heater is an electric heater.

21. The article of manufacture of claim 15, wherein the heater comprises a voltage source.

22. The article of manufacture of claim 21, wherein the voltage source comprises a pull tab or other device that allows the current to flow when activated.

23. An airtight package comprising the article of manufacture of claim 13, wherein the airtight package prevents heating of the article of manufacture before use.

24. The article of manufacture of claim 13, further comprising:
 a frame that folds out and holds the article at a predetermined angle relative to any mounting surface to which the article may be fixed.

* * * * *